United States Patent [19]
Iida

[11] 3,746,434
[45] July 17, 1973

[54] FILM REWINDING DEVICE FOR A MINIATURE MOTION

[75] Inventor: Yozo Iida, Tokyo, Japan

[73] Assignee: Nippon Kogaku K.K., Tokyo, Japan

[22] Filed: Oct. 27, 1970

[21] Appl. No.: 84,359

[30] Foreign Application Priority Data
Oct. 29, 1969 Japan..... 44/102011 (utility model)

[52] U.S. Cl..................... 352/91, 352/173, 352/217
[51] Int. Cl. ............................................ G03b 21/36
[58] Field of Search..................... 352/91, 173, 216, 352/217

[56] References Cited
UNITED STATES PATENTS

| 3,246,944 | 4/1966 | Winkler .................. 352/91 |
| 2,955,510 | 10/1960 | Heinz.................. 352/217 X |
| 3,545,852 | 12/1970 | Winkler et al. ............. 352/173 X |
| 3,567,316 | 3/1971 | Wilharm .................. 352/91 |
| 3,531,194 | 9/1970 | Roppel et al. ............ 352/217 |
| 3,578,853 | 5/1971 | Schwabhausen.............. 352/91 |
| 1,404,404 | 1/1922 | Pittman................ 352/217 |
| 1,362,199 | 12/1920 | Stringham.............. 352/217 |
| 2,065,777 | 12/1936 | Weissbroot ............. 352/217 |
| 3,494,691 | 2/1970 | Katsuyama............. 352/173 X |

FOREIGN PATENTS OR APPLICATIONS

| 340,049 | 8/1921 | Germany .............. 352/217 |
| 345,318 | 12/1921 | Germany ............. 352/217 |

*Primary Examiner*—Samuel S. Matthews
*Assistant Examiner*—Alan Mathews
*Attorney*—Ward, McElhannon, Brooks & Fitzpatrick

[57] ABSTRACT

This invention presents a film rewinding device for a miniature motion picture camera having a film transfer device and a light shielding device of, for example, the opening angle adjustable type shutter. The film transfer device has a normal-reversal switching device for changing over the direction of the transfer of the film. It is so arranged that when the normal reversal switching device is changed over to its reverse position, the light shielding device is fully closed to prevent the leakage of the light so that the film aperture area is automatically closed when the film is rewound.

5 Claims, 3 Drawing Figures

FILM REWINDING DEVICE FOR A MINIATURE MOTION

BACKGROUND OF THE INVENTION

1. Field of Invention

This invention relates to a film rewinding device for a miniature motion picture camera.

2. Description of the Prior Art

It has been proposed to prevent the light leakage at the film rewinding time by combining the opening angle adjusting type shutter and the normal-reverse switching device for changing over the direction of the transfer of the film so as to enable the reverse movement of the film only at the fully closed position of the shutter. However, such a conventional device is to prevent the reverse movement of the film, so that the reverse movement can only be possible by releasing the device for releasing the reverse prevention by operating the shutter opening operation member or light shielding member from its locked position. This requires troublesome operation.

SUMMARY OF THE INVENTION

The primary object of this invention is to overcome the defect encountered by the prior art by interlocking the normal-reverse switching device with the shutter opening angle adjusting device, in such a manner that simultaneously with the set to the reverse operative state, the shutter opening is fully closed. By this arrangement a simple film rewinding device for a miniature motion picture camera is provided without necessity of providing a special reverse-preventing member.

DESCRIPTION OF THE PREFERRED EMBODIMENT

Figure 1:
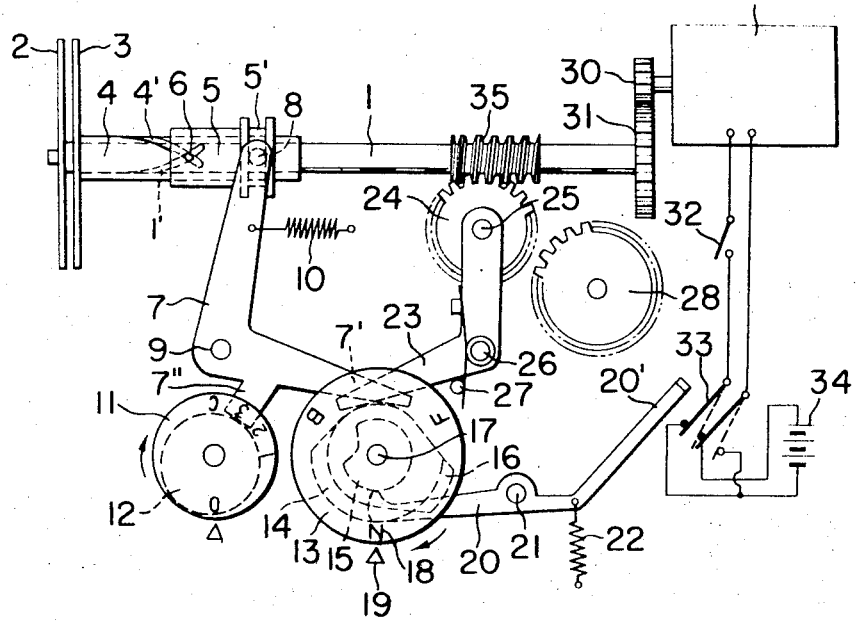
FIG. 1 shows a front view of an embodiment of this invention, illustrating the relationship of the principal structure of opening angle adjusting type shutter and the film rewinding change over device, in which the shutter opening angle is fully opened and normal phototaking is made.

The drawing shows an embodiment of the present invention. In FIG. 1, a shutter shaft 1 is reversibly rotatable by a micro-motor 29 through a small gear 30 and a shutter gear 31. At the front end portion of the shutter shaft 1, a lead groove 1' is formed, and the shaft 1 is supported rotatably in unison with a first sector 2. The shutter shaft 1 actuates a not shown conventional film feed claw means so as to change the direction of the transfer of the film. A second sector 3 is integrally formed with a sleeve 4 freely mounted on the shutter shaft 1 and on the sleeve 4, a spiral groove 4' is formed. On the sleeve 4, a sliding ring 5 is slidably mounted and at one end of the ring 5, a guide pin 6 is planted, which is engaged with said lead groove 1' and the spiral groove 4' and at another end of the ring 5, a circumferential groove 5' is formed.

An L-character shaped lever 7 is pivotaly supported by a pin 9 fixed to a camera body not shown and on one end the lever 7 is planted a feed pin 8 engaged with the circumference groove 5' of the sliding ring 5. The lever 7 is normally biased to rotate to the clockwise direction by a spring 10 so as to fully open the opening angle formed by the first and second sectors. The lever 7, which adjusts the opening angle of the first and second sectors provides a rightmost end portion 7' and the lower projected portion 7'', which contact with a clutch cam 14 and a cam disc 12, respectively. Knob 11 is to manually operate the opening angle of the first and second sectors and is provided at the camera body rotatable with the cam disc 12. When the knob 11 is rotated clockwisely, the sliding ring 5 is transferred to a predetermined position through the cam disc 12, lever 7 and feed pin 8 so as to vary the opening angle of the first and second sectors.

The clutch cam 14, a reversing cam 15 and a light shielding cam 16 are rotatably mounted on a shaft 17 which is integrally formed with a change-over operation knob 13 manually operable from outside of the camera. Indicating marks 18 are provided at predetermined positions on the knob 13, while an index 19 is provided at the camera body. A reversing lever 2 is pivotaly supported by a shaft 21 and contacts at its one end with the reversing cam 15 by a spring 22. The other end 20' of the lever 20 is interlocked with a conventional shutter shaft reversing device such as, for example, a switch 33 for normally or reversely rotating a motor.

A clutch lever 23 is formed in reverse-L-character shape, and is pivotaly supported by a shaft 26 fixed to the camera body and normally biased by a spring 27 to rotate counterclockwise so as to press contact with the clutch cam 14. On the upper end portion of the lever 23, a shaft 25 is provided, on which a clutch gear 24 is supported freely rotatable. The gear 24 engages with a worm 35 and can selectively engage with a counter gear 28, which is interlocked with conventional and not shown reversing counter and a device automatically stopped at a predetermined length of the film.

The micro motor 29 has on its output shaft, the small gear 30, which meshes with the shutter gear 31 mounted on the shutter shaft 1 which in turn rotates normal or reversing direction through the aid of the switch 33. Electric saurce battery 34, the normal-reverse switch 33, the micromotor 29, not shown shutter button and the switch 32 for the shutter button are connected to form a circuit.

The indicating marks 18 consists of the marks N, B and F. The clutch cam 14 is so formed that when the index 19 matches with the mark N, the clutct lever 23 rotates so that the clutch gear 24 does not mesh with the counter gear 28, and when the index 19 matches with the mark F or B, the clutch lever 23 rotates so that the clutch gear 24 meshes with the counter gear 28. On the other hand, the reversing cam 15 is so formed that when the index 19 matches with the mark N or F, the reversing lever 20 rotates so that the switch 33 is switched to the normal position to rotate the motor in its normal direction, and when the index 19 matches with the mark B, the reversing lever 20 rotates so that the switch 33 is switched to its reverse position for rotating the motor reversely.

The light shield cam 16 is so arranged that when the index 19 matches with the mark N or F, the lever 7 rotates to fully open the angle formed by the first sector 2 and the sector 3, and the index 19 matches with the mark B, the lever rotates to fully close the opening angle formed by the first and second sectors.

According to the above, as shown in FIG. 1, when the mark N on the knob 13 is matched with the index 19 and the shutter button is released, the micro motor 29 begins to rotate so that the film is fed to the normal phototaking direction through the aid of not shown film transfer means, and simultaneously, the first sector 2 and the second sector 3 rotate at their full-opened opening angle so that the phototaking can be performed. From this state, as the knob 11 is rotated clockwise, the sliding ring 5 shifts leftwardly against the spring 10 through the opening angle adjusting lever 7 and the feed pin 8 so that the opening angle of the first and second sectors can be continuously reduced.

Figure 2:
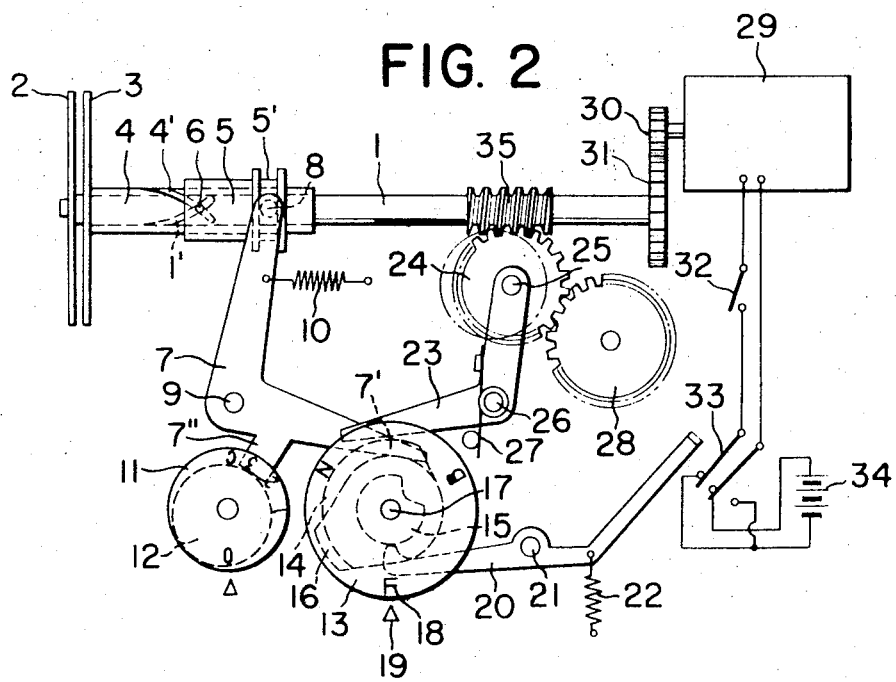
FIG. 2 shows a front view similar to FIG. 1, but in this figure, the normal phototaking state is changed over to the overlapping phototaking state.

Next as shown in FIG. 2, when the mark F on the knob 13 is matched with the index 19, the clutch gear 24 will mesh with the counter gear 28 against the spring 27 through the clutch cam 14, and then when the not shown shutter button is depressed, the normal rotating phototaking is performed and the length of the firstly exposed film is counted. At this instance, the lever 7 remains at its previous position, however, the lever 7 may be operated.

Figure 3:
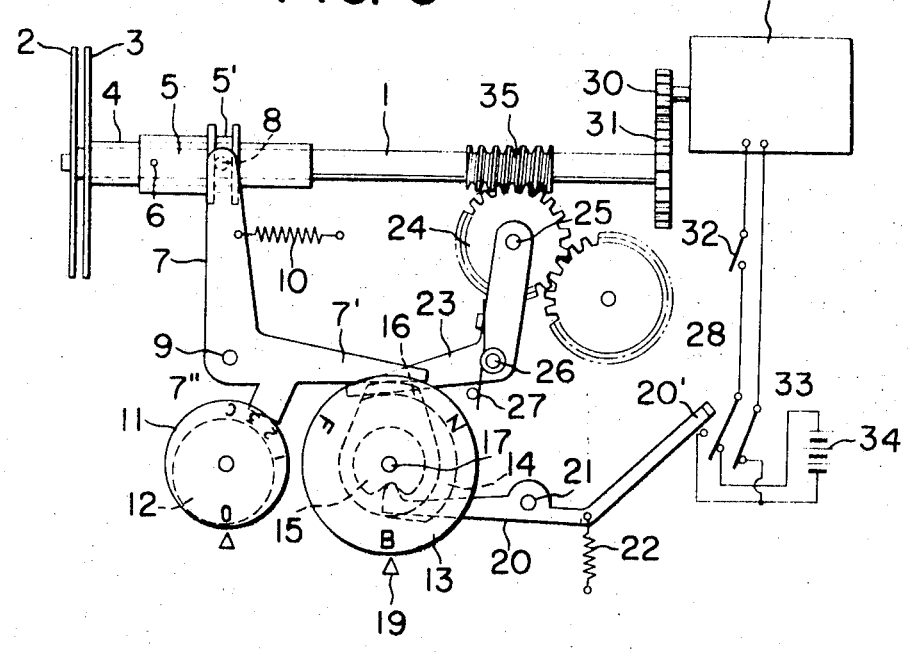
FIG. 3 shows a front view similar to FIG.1, but in this figure, the shutter opening angle is fully closed ready for film rewinding.

When the mark B on the knob 13 is matched with the index 19 as shown in FIG. 3, the clutch gear 24 remains engaged with the counter gear 28, the opening angle adjusting lever 7 is rotated counterclockwise by the light shield cam 16 so that the sliding ring 5 moves leftwardly through the feed pin 8 and the opening angle of the first sector 2 and the second sector becomes zero, i.e., fully closed. Consequently, the light leakage due to the missing of closing the shutter blades, i.e., sectors 2 and 3, when the film is rewound can be perfectly avoided. And the reversing lever 20 falls on the reduced diameter portion of the reversing cam 15 and rotates, and the switch 33 is changed over by the end 20' of the lever 20, so that when the shutter button is depressed at this stage, the shutter shaft 1 rotates reversely so as to reversely move the not shown film feeding claw for rewinding the film and simultaneously, the counter gear 28, which has counted the film length of the first exposure, rotates reversely and the same length of the film as that of the first exposed film is rewound by not shown automatic stop device. From this state, the mark N on the knob 13 is matched with the index 19, the clutch lever 23, the opening angle adjusting lever 7 and the reversing lever 20 are returned to their previous positions shown in FIG. 1, by the spring 27, spring 10 and the cam 15, respectively, and the sliding ring 5 shifts to set the first sector 2 and the second sector 3 to its full opened angle, the clutch gear 24 is disengaged from the counter gear 28 and the reversing switch 33 is changed over to its normal side. Therefore, when the shutter button is depressed, the shutter shaft 1 and the not show film feed claw device are actuated in their normal direction so that on the firstly exposed film, a second exposure is overlapped to perform a double exposure.

According to the present invention, the light shilding member is not limited to the opening angle adjusting type shutter, i.e., the first and second sectors, but also the present invention can be practiced with the combination of other type of the light shielding member.

As described above, in accordance with the present invention, when the film is rewound, the light shielding member and the reversing operating member are interlocked so that the light shield at the film rewinding can be performed only by reversing operation which is very simple and perfect. Moreover, such a reverse-preventing device or reverse-protectional switch is not required.

What is claimed is:

1. In a miniature motion picture camera comprising a film transfer device including changeover means for manually changing over the direction of transfer of the film between a normal condition in which the film is forwardly transferred and a reverse condition in which the film is rewound; a variable shutter including two sectors for defining an aperture-area for passing light therethrough and being movable between a first position for permitting light to reach the film and a second position for preventing light from reaching the film; and means for adjusting said variable shutter interconnected with said changeover means and said variable shutter in such a manner that the adjusting means displaces said variable shutter to the second position when the changeover means is changed over to said reverse condition, wherein said means for adjusting said variable shutter comprises a shutter shaft, means carried by a shutter shaft for adjusting the relative angular positions of said two sectors; a pivotally mounted L-shaped lever having a first projection for engaging said means carried by said shutter shaft, said L-shaped lever having a second projection, a light shielding cam which engages said second projection to rotate said first projection to actuate said means carried by said shutter shaft for adjusting said aperture-area, said light shielding cam having surfaces for moving said second projection to effect fade-in and fade-out shooting, and said light shielding cam having another surface for moving said second projection to effect closure of said aperture-area and said light shielding cam having still another surface for moving said second projection to effect opening of said aperture-area.

2. A device according to claim 1 wherein said L-shaped lever has a third projection, a cam disc engaging said third projection to rotate said first projection to actuate said means carried by said shutter shaft for manually adjusting said aperture-area.

3. In a miniature motion picture camera comprising a film transfer device including changeover means for manually changing over the direction of transfer of the film between a normal condition in which the film is forwardly transferred and a reverse condition in which the film is rewound; a variable shutter including two sectors for defining an aperture-area for passing light therethrough and being movable between a first position for permitting light to reach the film and a second position for preventing light from reaching the film; and means for adjusting said variable shutter interconnected with said changeover means and said variable shutter in such a manner that the adjusting means displaces said variable shutter to the second position when the changeover means is changed over to said reverse condition, wherein said means for adjusting said variable shutter comprises a shutter shaft having a lead groove, one of said sectors being fixedly mounted on said shutter shaft, a sleeve mounted on said shutter shaft carrying the other of said sectors, said sleeve having a lead groove, a sliding ring mounted on said shaft carrying a guide pin, both of said lead grooves receiving said guide pin, means for longitudinally sliding said sliding ring to adjust said aperture-area.

4. A device according to claim 3 wherein said means for longitudinally sliding said sliding ring comprises a pivotally mounted L-shaped lever having a first projection for engaging said sliding ring, said lever having a second projection; said changeover means including a light shielding cam which engages said second projection to rotate said first projection to slide said sliding ring for adjusting said aperture-area.

5. A device according to claim 4 wherein said pivotally mounted L-shaped lever has a second projection, a manually movable cam disc engaging said second projection to rotate said first projection to slide said sliding ring for adjusting said aperture-area.

* * * * *

UNITED STATES PATENT OFFICE
CERTIFICATE OF CORRECTION

Patent No. 3,746,434    Dated July 17, 1973

Inventor(s) YOZO IIDA

It is certified that error appears in the above-identified patent and that said Letters Patent are hereby corrected as shown below:

Front Page, at [54], change title of invention from "FILM REWINDING DEVICE FOR A MINIATURE MOTION" to -- FILM REWINDING DEVICE FOR A MINIATURE MOTION PICTURE CAMERA --.

Column 2, line 23, change "reversing lever 2" to -- reversing lever 20 --.

Column 3, line 38, change "thelever" to -- the lever --.

Signed and sealed this 18th day of December 1973.

(SEAL)
Attest:

EDWARD M. FLETCHER, JR.
Attesting Officer

RENE D. TEGTMEYER
Acting Commissioner of Patents